(12) United States Patent
Meng et al.

(10) Patent No.: US 11,758,293 B2
(45) Date of Patent: Sep. 12, 2023

(54) METHOD AND SYSTEM FOR CALCULATING A FOCUSING PARAMETER OF A BINOCULAR STEREO CAMERA, AND INTELLIGENT TERMINAL

(71) Applicant: Beijing Smarter Eye Technology Co. Ltd., Beijing (CN)

(72) Inventors: Ran Meng, Beijing (CN); Hua Chai, Beijing (CN); Zhe Wang, Beijing (CN); Yong Jia, Beijing (CN)

(73) Assignee: Beijing Smarter Eye Technology Co. Ltd., Beijing (CN)

( * ) Notice: Subject to any disclaimer, the term of this patent is extended or adjusted under 35 U.S.C. 154(b) by 0 days.

(21) Appl. No.: 17/643,305

(22) Filed: Dec. 8, 2021

(65) Prior Publication Data
US 2023/0037072 A1 Feb. 2, 2023

(30) Foreign Application Priority Data
Jul. 21, 2021 (CN) .......................... 202110824744.5

(51) Int. Cl.
*H04N 5/232* (2006.01)
*H04N 13/239* (2018.01)
*H04N 23/959* (2023.01)

(52) U.S. Cl.
CPC ......... *H04N 23/959* (2023.01); *H04N 13/239* (2018.05)

(58) Field of Classification Search
CPC .. H04N 23/959; H04N 13/239; H04N 13/204; H04N 13/296; H04N 23/67; H04N 23/675; H04N 13/236; H04N 13/246; H04N 13/271

USPC .......................................................... 348/47
See application file for complete search history.

(56) References Cited

U.S. PATENT DOCUMENTS

| | | | |
|---|---|---|---|
| 10,999,522 B2 * | 5/2021 | Kazami | G06T 7/80 |
| 11,060,864 B1 * | 7/2021 | Ho | G01C 11/06 |
| 2002/0044691 A1 * | 4/2002 | Matsugu | G06V 10/10 |
| | | | 382/218 |
| 2016/0148387 A1 * | 5/2016 | Kitago | G06T 7/593 |
| | | | 382/106 |
| 2017/0003573 A1 * | 1/2017 | Dayana | H04N 23/959 |
| 2019/0265029 A1 * | 8/2019 | Wang | G01B 11/26 |
| 2021/0051262 A1 * | 2/2021 | Wang | H04N 23/675 |

* cited by examiner

*Primary Examiner* — Susan E. Torgerson
(74) *Attorney, Agent, or Firm* — NKL Law; Allen Xue

(57) ABSTRACT

A method and a system for calculating a focusing parameter of a binocular stereo camera, and an intelligent terminal are provided. The method includes: calculating a lower limit value and an upper limit value of a distance measurement range; acquiring a depth-of-field range in accordance with the lower limit value and the upper limit value; calculating a maximum value and a minimum value of an image distance gain corresponding to a real object distance within the depth-of-field range, and calculating an optimal image distance gain in accordance with the maximum value and the minimum value; acquiring an optimal object distance of a focused target in accordance with the optimal image distance gain; and calculating an optimal size of the focused target in accordance with the optimal object distance.

7 Claims, 2 Drawing Sheets

METHOD AND SYSTEM FOR CALCULATING A FOCUSING PARAMETER OF A BINOCULAR STEREO CAMERA, AND INTELLIGENT TERMINAL

TECHNICAL FIELD

The present disclosure relates to the field of a focusing method of a binocular camera, in particular to a method and a system for calculating a focusing parameter of a binocular stereo camera, and an intelligent terminal.

BACKGROUND

For binocular stereo vision, two images of a to-be-measured object are acquired by two imaging devices at different positions, and a position difference (also called as disparity) between corresponding pixel points in the images are calculated to acquire a distance between the object and the imaging device, thereby to acquire three-dimensional information about the object in a coordinate system of the camera. Usually, the imaging device for the binocular stereo vision consists of two same cameras juxtaposed with each other and spaced apart from each other by a certain distance (also called as baseline distance), and this imaging device is usually called as binocular stereo camera (hereinafter referred to as binocular camera).

For an imaging device with a constant focal length in such fields as industry, transportation, aerospace and military, it is necessary to focus the imaging device during the assembling. In a focusing process, a distance between an optical lens and an imaging plane (usually called as image distance) is adjusted in such a manner that a target within an object distance range is imaged clearly on the imaging plane.

For the imaging device, an imaging effect directly depends on focusing accuracy, so there is an urgent need to provide a method for calculating a focusing parameter of the binocular stereo camera, so as to accurately calculate such focusing parameters as focusing position and target size in accordance with specific parameters of an application scenario, thereby to improve the focusing accuracy.

SUMMARY

An object of the present disclosure is to provide a method and a system for calculating a focusing parameter of a binocular stereo camera, and an intelligent terminal, so as to solve the problem in the related art where the focusing accuracy is insufficient when the binocular stereo camera is focused with experience.

In one aspect, the present disclosure provides in some embodiments a method for calculating a focusing parameter of a binocular stereo camera, including: calculating a lower limit value and an upper limit value of a distance measurement range; acquiring a depth-of-field range in accordance with the lower limit value and the upper limit value; calculating a maximum value and a minimum value of an image distance gain corresponding to a real object distance within the depth-of-field range, and calculating an optimal image distance gain in accordance with the maximum value and the minimum value; acquiring an optimal object distance of a focused target in accordance with the optimal image distance gain; and calculating an optimal size of the focused target in accordance with the optimal object distance.

In a possible embodiment of the present disclosure, the calculating the lower limit value and the upper limit value of the distance measurement range includes: calculating the lower limit value of the distance measurement range through $U_{min}=f \times B/d_{max}$; and calculating the upper limit value of the distance measurement range through $U_{max}=f \times B/d_{min}$, where f represents a focal length of the binocular stereo camera, $U_{min}$ represents the lower limit value of the distance measurement range, $U_{max}$ represents the upper limit value of the distance measurement range, $d_{max}$ represents a maximum disparity value of an object, $d_{min}$ represents a minimum disparity value of the object, and B represents a baseline distance of the binocular stereo camera.

In a possible embodiment of the present disclosure, the calculating the maximum value and the minimum value of the image distance gain corresponding to the real object distance within the depth-of-field range includes calculating the image distance gain through $\Delta V = V_{real} - f = f^2/U_{real}$, where $U_{real}$ represents the real object distance of the object, $V_{real}$ represents an image distance corresponding to the object, f represents a focal length, and $\Delta V$ represents the image distance gain.

In a possible embodiment of the present disclosure, the calculating the optimal image distance gain in accordance with the maximum value and the minimum value of the image distance gain corresponding to the real object distance includes calculating the optimal image distance gain through $\Delta V_{best} = (\Delta V_{max} - \Delta V_{min})/2 + \Delta V_{min}$, where $\Delta V_{best}$ represents the optimal image distance gain, $\Delta V_{max}$ represents a maximum value of the image distance gain, and $\Delta V_{min}$ represents the minimum value of the image distance gain.

In a possible embodiment of the present disclosure, the acquiring the optimal object distance of the focused target in accordance with the optimal image distance gain includes calculating the optimal object distance of the focused target through $U_{best} = f^2/\Delta V_{best}$, where $U_{best}$ represents the optimal object distance of the focused target, $\Delta V_{best}$ represents the optimal image distance gain, and f represents a focal length of the binocular stereo camera.

In a possible embodiment of the present disclosure, the calculating the optimal size of the focused target in accordance with the optimal object distance includes: determining a profile of the focused target, and calculating an image size of a line pair and a size of the target; and calculating the quantity of line pairs and a width of a line pair in accordance with the image size of the line pair and the size of the target.

In a possible embodiment of the present disclosure, the calculating the image size of the line pair includes calculating the image size of the line pair through $Wid_{lp} = Num_{pixel} \times Wid_{sensor}$, where $Num_{pixel}$ represents the quantity of pixels corresponding to one line pair, $Wid_{sensor}$ represents a size of a photosensitive unit in a pixel, and $Wid_{lp}$ represents the image size of one line pair.

In a possible embodiment of the present disclosure, the calculating the size of the target, the quantity of line pairs and the width of the line pair includes: calculating the size of the target through $$\frac{Wid_{Obj}}{U_{best}} = \frac{Wid_{Img}}{V_{best}};$$

calculating the quantity of line pairs through $Num_{lp} = Wid_{Img}/Wid_{lp}$; and calculating the width of the line pair through $Wid_{reallp} = Wid_{Obj}/Num_{lp}$, where $Wid_{Obj}$ represents a real width of the target, $Wid_{Img}$ represents a width of the target when it is imaged in a sensor, $U_{best}$ represents the optimal object distance of the target, $V_{best}$ represents the optimal image distance gain, $Num_{lp}$ represents the quantity of line pairs of the target, $Wid_{lp}$ represents a width of one line pair when it is imaged in the sensor, $Wid_{reallp}$ represents a width of the line pair on the target, and $Wid_{Obj}$ represents the size of the target.

In another aspect, the present disclosure provides in some embodiments a system for calculating a focusing parameter of a binocular stereo camera, including: a distance calculation unit configured to calculate a lower limit value and an upper limit value of a distance measurement range; a depth-of-field calculation unit configured to acquire a depth-of-field range in accordance with the lower limit value and the upper limit value; an image distance gain calculation unit configured to calculate a maximum value and a minimum value of an image distance gain corresponding to a real object distance within the depth-of-field range, and calculate an optimal image distance gain in accordance with the maximum value and the minimum value; a target position calculation unit configured to acquire an optimal object distance of a focused target in accordance with the optimal image distance gain; and a target size calculation unit configured to calculate an optimal size of the focused target in accordance with the optimal object distance.

In yet another aspect, the present disclosure provides in some embodiments an intelligent terminal, including a data collection unit, a processor and a memory. The data collection unit is configured to collected data, the memory is configured to store therein one or more program instructions, and the processor is configured to execute the one or more program instructions to implement the above-mentioned method.

According to the method for calculating the focusing parameter of the binocular stereo camera in the embodiments of the present disclosure, the lower limit value and the upper limit value of the distance measurement range are calculated, the depth-of-field range is acquired in accordance with the lower limit value and the upper limit value, the maximum value and the minimum value of the image distance gain corresponding to the real object distance within the depth-of-field range are calculated, the optimal image distance gain is calculated in accordance with the maximum value and the minimum value, the optimal object distance of the focused target is acquired in accordance with the optimal image distance gain, and the optimal size of the focused target is calculated in accordance with the optimal object distance. As a result, it is able to accurately calculate such focusing parameters as a focusing position and a target size in accordance with a specific parameter of an application scenario, thereby to improve an imaging effect, and solve the problem in the related art where the focusing accuracy is insufficient when the binocular stereo camera is focused with experience.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

The structure, scale and size shown in the drawings are merely provided to facilitate the understanding of the contents disclosed in the description but shall not be construed as limiting the scope of the present disclosure, so they has not substantial meanings technically. Any modification on the structure, any change to the scale or any adjustment on the size shall also fall within the scope of the present disclosure in the case of not influencing the effects and the purposes of the present disclosure.

DETAILED DESCRIPTION

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

Figure 1:
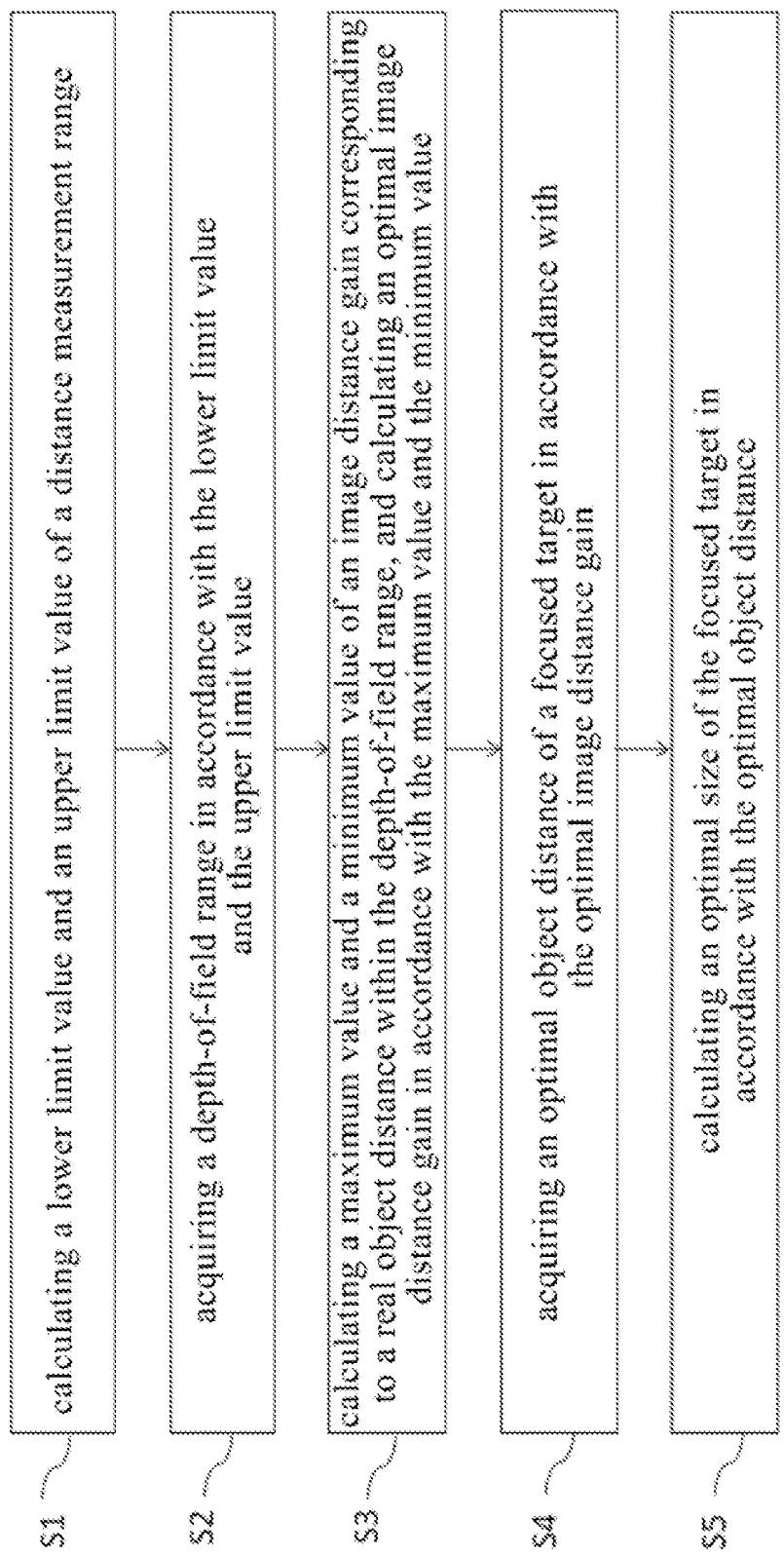
FIG. 1 is a flow chart of a method for calculating a focusing parameter of a binocular stereo camera according to one embodiment of the present disclosure.

As shown in FIG. 1, the present disclosure provides in some embodiments a method for calculating a focusing parameter of a binocular stereo camera, which includes: S1 of calculating a lower limit value and an upper limit value of a distance measurement range; S2 of acquiring a depth-of-field range in accordance with the lower limit value and the upper limit value; S3 of calculating a maximum value and a minimum value of an image distance gain corresponding to a real object distance within the depth-of-field range, and calculating an optimal image distance gain in accordance with the maximum value and the minimum value; S4 of acquiring an optimal object distance of a focused target in accordance with the optimal image distance gain; and S5 of calculating an optimal size of the focused target in accordance with the optimal object distance.

The calculating the lower limit value and the upper limit value of the distance measurement range includes: calculating the lower limit value of the distance measurement range through $U_{min}=f \times B/d_{max}$; and calculating the upper limit value of the distance measurement range through $U_{max}=f \times B/d_{min}$, where f represents a focal length of the binocular stereo camera, $U_{min}$ represents the lower limit value of the distance measurement range, $U_{max}$ represents the upper limit value of the distance measurement range, $d_{max}$ represents a maximum disparity value of an object, $d_{min}$ represents a minimum disparity value of the object, and B represents a baseline distance of the binocular stereo camera.

To be specific, in S1, when calculating the lower limit value of the distance measurement range, a relationship among the focal length of the binocular stereo camera, an object distance, the baseline distance and a disparity value is expressed through the following equation $$\frac{f}{U} = \frac{d}{B}, \quad (1)$$

where f represents the focal length of the binocular stereo camera, U represents the object distance (i.e., a distance between the object and an optical center of a lens), d represents the disparity value of the object, and B represents the baseline distance of the binocular stereo camera. Based on the equation (1), the following equation $U=f \times B/d$ (2) is acquired.

Based on the equation (2), when an active disparity value is maximum, the object distance U is minimum, i.e., the lower limit value $U_{min}$ of the distance measurement range of the binocular stereo camera. The maximum active disparity value equals to a search range of a disparity matching algorithm. When a real disparity value of a certain point is greater than this value, it is impossible to acquire an active disparity result for this point, and at this time, this point is set as an invalid point. For example, in a specific application scenario, the baseline distance of the binocular stereo camera is 120 mm, the focal length of the lens is 8 mm, the search range of the disparity matching algorithm is 80 pixels, and a size of a photosensitive unit in each pixel is 4.25 nm*4.25 nm, the lower limit value of the distance measurement range may be calculated through the above equation (2), i.e., $U_{min}$=120 mm×8 mm/(80×0.0042 mm)≈2857 mm.

During the calculation of the upper limit value of the distance measurement range, based on equation (2), when the active disparity value is minimum, the object distance U is maximum, i.e., the upper limit value $U_{max}$ of the distance measurement range of the binocular stereo camera. Generally, in the case of ensuring the distance measurement accuracy, a minimum active disparity value is usually 1 to 5 pixels. When the minimum active disparity value is 2 pixels, in the above scenario, the upper limit value is calculated as $U_{max}$=120 mm×8 mm/(2×0.0042 mm)≈114285 mm.

In S2, the depth-of-field range is just the distance measurement range. After the focusing, it is necessary to ensure that a clear image of the object within the distance measurement range is acquired on a sensor. In the above application scenario, the depth-of-field may be 2.8 m to 114 m.

Further, in S3, the calculating the maximum value and the minimum value of the image distance gain corresponding to the real object distance within the depth-of-field range specifically includes calculating the image distance gain through $\Delta V=V_{real}-f=f^2/U_{real}$, where $U_{real}$ represents the real object distance of the object, $V_{real}$ represents an image distance corresponding to the object, f represents the focal length, and $\Delta V$ represents the image distance gain.

To be specific, when the object distance U is infinitely great (i.e., the object is located at a point at infinity), the corresponding image distance V is minimum, and at this time, V equals to the focal length f. When U has a certain value $U_{real}$, the corresponding image distance is $V_{real}$ and at this time, the image distance gain may be defined as $\Delta V=V_{real}-f=f^2/U_{real}$ (3), where $U_{real}$ represents the real object distance of the object, $V_{real}$ represents the image distance corresponding to the object, f represents the focal length, and $\Delta V$ may be understood as an increment of the real image distance corresponding to the object relative to the focal length.

Still in the above application scenario, based on equation (3), the maximum value and the minimum value of the image distance gain corresponding to the real image distance within the depth-of-field range may be calculated as $\Delta V_{max}$=8 mm×8 mm/2800 mm≈0.022857 mm and $\Delta V_{min}$=8 mm×8 mm/114000 mm≈0.000561 mm.

Further, in S3, the calculating the optimal image distance gain in accordance with the maximum value and the minimum value of the image distance gain corresponding to the real object distance specifically includes calculating the optimal image distance gain through $\Delta V_{best}=(\Delta V_{max}-\Delta V_{min})/2+\Delta V_{min}$, where $\Delta V_{best}$ represents the optimal image distance gain, $\Delta V_{max}$ represents a maximum value of the image distance gain, and $\Delta V_{min}$ represents the minimum value of the image distance gain.

To be specific, during the calculation of the optimal image distance gain corresponding to the focused target, when the image distance is $f+\Delta V_{max}$, it is able to acquire a clear image of the object at a point having the lower limit value of the depth-of-field range, and when the image distance is $f+\Delta V_{min}$, it is able to acquire a clear image of the object at a point having the upper limit value of the depth-of-field range. In order to take the clarity of the images of all objects within the depth-of-field range into consideration, i.e., in order to provide the images of the object at a point having the lower limit value and the object at a point having the upper limit value with a same confusion level, a position of an ideal image distance of the focused target may be a middle point between the maximum value and the minimum value of the image distance gain, i.e., the optimal image distance gain $\Delta V_{best}$ may be calculated through $\Delta V_{best}$ $(\Delta V_{max}-\Delta V_{min})/2+\Delta V_{min}$ (4).

In the above application scenario, the optimal image distance gain is $\Delta V_{best}$=(22.857 nm–0.561 nm)/2+0.561 nm≈11.709 nm.

In S4, the acquiring the optimal object distance of the focused target in accordance with the optimal image distance gain includes calculating the optimal object distance of the focused target through $U_{best}=f^2/\Delta V_{best}$, where $U_{best}$ represents the optimal object distance of the focused target, $\Delta V_{best}$ represents the optimal image distance gain, and f represents the focal length of the binocular stereo camera.

To be specific, based on the above equation (3), $U_{real}=f^2/\Delta V$ (5). The optimal image distance gain may be substituted into equation (5), so as to acquire the optimal object distance of the focused target. In the above application scenario, the optimal object distance of the focused target is $U_{best}=8^2/11.709\times 10^{-3}$=5.466 m.

During the implementation, the calculating the optimal size of the focused target in accordance with the optimal object distance includes: determining a profile of the focused target, and calculating an image size of a line pair and a size of the target; and calculating the quantity of line pairs and a width of a line pair in accordance with the image size of the line pair and the size of the target.

In order to evaluate a change in the clarity during the focusing as well as a change in a transfer function of an imaging system in a better manner, the focused target includes black and white stripes parallel to each other and arranged alternately, or black and white concentric circles arranged alternately. Usually, the black and white regions have a same width (or different widths). The widths of the black and white regions are arranged in such a manner to provide a corresponding image width of 1 to 5 pixels, and here the image width having two pixels is taken as an example.

To be specific, the image size of one line pair is calculated through $Wid_{lp}=Num_{pixel}\times Wid_{sensor}$, where $Num_{pixel}$ represents the quantity of pixels corresponding to one line pair, $Wid_{sensor}$ represents a size of a photosensitive unit in a pixel, and $Wid_{lp}$ represents the image size of one line pair. The size of the target is calculated through $$\frac{Wid_{Obj}}{U_{best}} = \frac{Wid_{Img}}{V_{best}},$$

where $Wid_{Obj}$ represents a real width of the target, $Wid_{Img}$ represents a width of the target when it is imaged in a sensor, $U_{best}$ represents the optimal object distance of the target, and $V_{best}$ represents the optimal image distance gain. The quantity of line pairs is calculated through $Num_{lp}=Wid_{Img}/Wid_{lp}$, where $Wid_{Obj}$ represents the real width of the target, $Wid_{Img}$ represents the width of the target when it is imaged in a sensor, $U_{best}$ represents the optimal object distance of the target, and $V_{best}$ represents the optimal image distance gain. The width of the line pair is calculated through $Wid_{reallp}=Wid_{Obj}/Num_{lp}$, where $Wid_{reallp}$ represents a width of the line pair on the target, $Wid_{Obj}$ represents the size of the target, and $Num_{lp}$ represents the quantity of line pairs of the target.

During the calculation of the image size of one line pair, one line pair consists of one black stripe and one white stripe. When an image width corresponding to the width of the black or white region includes 2 pixels, the image width of one line pair includes 4 pixels. The image size of one line pair is calculated through $Wid_{lp}=Num_{pixel}\times Wid_{sensor}$ (6), where $Num_{pixel}$ represents the quantity of pixels corresponding to one line pair, $Wid_{sensor}$ represents the size of one photosensitive unit in a pixel, and $Wid_{lp}$ represents the image size of one line pair.

In the above application scenario, the image size of one line pair is 4 pixel*4.25 nm/pixel=17 nm, and the size of the target is calculated through $$\frac{Wid_{Obj}}{U_{best}} = \frac{Wid_{Img}}{V_{best}}, \quad (7)$$

where $Wid_{Obj}$ represents the real width of the target, $Wid_{Img}$ represents the width of the image of the target when it is imaged in the sensor, $U_{best}$ represents the optimal object distance of the target, and $V_{best}$ represents an optimal image plane position (i.e., an optimal focusing result). $V_{best}=\Delta V_{best}+f$ (8), i.e., the optimal image plane position is a sum of the focal length and the optimal image distance gain.

In the above application scenario, when the width of the image of the target in the sensor has a width of $Wid_{Img}=2$ mm (not a unique value), $V_{best}=8$ mm+11.709 nm≈8.012 mm and $U_{best}=5.466$ m=5466 mm, the size of the target is $Wid_{Obj}=5466$ mm×2 mm/8.012 mm≈1364 mm.

When calculating the quantity of line pairs and the width of the line pair, in the above application scenario, the width of the image of the target in the sensor is $Wid_{Img}=2$ mm, and the image size of one line pair is 17 nm, so the quantity of line pairs is calculated through $Num_{lp}=Wid_{Img}/Wid_{lp}$ (9), where $Num_{lp}$ represents the quantity of line pairs of the target, $Wid_{Img}$ represents the width of the image of the target in the sensor, and $Wid_{lp}$ represents the width of one line pair when it is imaged in the sensor.

In the above application scenario, $Num_{lp}=2$ mm/17 nm≈117 line pairs.

The width of the line pair on the target is calculated through $Wid_{reallp}=Wid_{Obj}/Num_{lp}$ (10), where $Wid_{reallp}$ represents the width of the lien pair on the target, $Wid_{Obj}$ represents the size of the target, and $Num_{lp}$ represents the quantity of line pairs of the target. In the above application scenario, $Wid_{reallp}=1364$ mm/117≈11.6 mm.

According to the method for calculating the focusing parameter of the binocular stereo camera in the embodiments of the present disclosure, the lower limit value and the upper limit value of the distance measurement range are calculated, the depth-of-field range is acquired in accordance with the lower limit value and the upper limit value, the maximum value and the minimum value of the image distance gain corresponding to the real object distance within the depth-of-field range are calculated, the optimal image distance gain is calculated in accordance with the maximum value and the minimum value, the optimal object distance of the focused target is acquired in accordance with the optimal image distance gain, and the optimal size of the focused target is calculated in accordance with the optimal object distance. As a result, it is able to accurately calculate such focusing parameters as a focusing position and a target size in accordance with a specific parameter of an application scenario, thereby to solve the problem in the related art where the focusing accuracy is insufficient.

Figure 2:
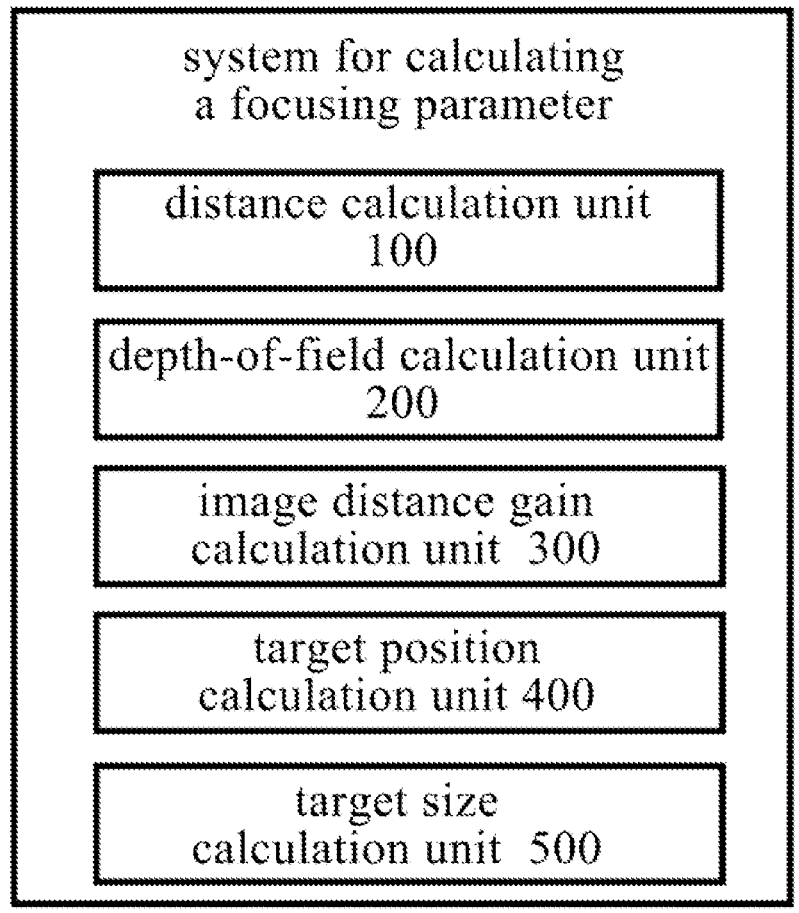
FIG. 2 is a block diagram of a system for calculating a focusing parameter of a binocular stereo camera according to one embodiment of the present disclosure.

The present disclosure further provides in some embodiments a system for calculating a focusing parameter of a binocular stereo camera for implementing the above-mentioned method. As shown in FIG. 2, the system includes: a distance calculation unit 100 configured to calculate a lower limit value and an upper limit value of a distance measurement range; a depth-of-field calculation unit 200 configured to acquire a depth-of-field range in accordance with the lower limit value and the upper limit value; an image distance gain calculation unit 300 configured to calculate a maximum value and a minimum value of an image distance gain corresponding to a real object distance within the depth-of-field range, and calculate an optimal image distance gain in accordance with the maximum value and the minimum value; a target position calculation unit 400 configured to acquire an optimal object distance of a focused target in accordance with the optimal image distance gain; and a target size calculation unit 500 configured to calculate an optimal size of the focused target in accordance with the optimal object distance.

The distance calculation unit 100 is specifically configured to: calculate the lower limit value of the distance measurement range through $U_{min}=f\times B/d_{max}$; and calculate the upper limit value of the distance measurement range through $U_{max}=f\times B/d_{min}$, where f represents a focal length of the binocular stereo camera, $U_{min}$ represents the lower limit value of the distance measurement range, $U_{max}$ represents the upper limit value of the distance measurement range, $d_{max}$ represents a maximum disparity value of an object, $d_{min}$ represents a minimum disparity value of the object, and B represents a baseline distance of the binocular stereo camera.

The depth-of-field calculation unit 200 is specifically configured to calculate the image distance gain through $\Delta V=V_{real}-f=f^2/U_{real}$, where $U_{real}$ represents the real object distance of the object, $V_{real}$ represents an image distance corresponding to the object, f represents a focal length, and $\Delta V$ represents the image distance gain.

The image distance gain calculation unit 300 is specifically configured to calculate the optimal image distance gain through $\Delta V_{best}=(\Delta V_{max}-\Delta V_{min})/2+\Delta V_{min}$, where $\Delta V_{best}$ represents the optimal image distance gain, $\Delta V_{max}$ represents a maximum value of the image distance gain, and $\Delta V_{min}$ represents the minimum value of the image distance gain.

The target position calculation unit 400 is specifically configured to calculate the optimal object distance of the focused target through $U_{best}=f^2/\Delta V_{best}$, where $U_{best}$ represents the optimal object distance of the focused target, $\Delta B_{best}$ best represents the optimal image distance gain, and f represents a focal length of the binocular stereo camera.

The target size calculation unit 500 is specifically configured to: determine a profile of the focused target, and calculate an image size of a line pair and a size of the target;

and calculate the quantity of line pairs and a width of a line pair in accordance with the image size of the line pair and the size of the target.

To be specific, the target size calculation unit 500 is configured to calculate the image size of the line pair through $Wid_{lp}=Num_{pixel} \times Wid_{sensor}$, where $Num_{pixel}$ represents the quantity of pixels corresponding to one line pair, $Wid_{sensor}$ represents a size of a photosensitive unit in a pixel, and $Wid_{lp}$ represents the image size of one line pair.

To be specific, the target size calculation unit 500 is configured to: calculate the size of the target through $$\frac{Wid_{Obj}}{U_{best}} = \frac{Wid_{Img}}{V_{best}};$$

calculate the quantity of line pairs through $Num_{lp}=Wid_{Img}/Wid_{lp}$; and calculate the width of the line pair through $Wid_{reallp}=Wid_{Obj}/Num_{lp}$, where $Wid_{Obj}$ represents a real width of the target, $Wid_{Img}$ represents a width of the target when it is imaged in a sensor, $U_{best}$ represents the optimal object distance of the target, $V_{best}$ represents the optimal image distance gain, $Num_{lp}$ represents the quantity of line pairs of the target, $Wid_{lp}$ represents a width of one line pair when it is imaged in the sensor, $Wid_{reallp}$ represents a width of the line pair on the target, and $Wid_{Obj}$ represents the size of the target.

According to the system for calculating the focusing parameter of the binocular stereo camera in the embodiments of the present disclosure, the lower limit value and the upper limit value of the distance measurement range are calculated, the depth-of-field range is acquired in accordance with the lower limit value and the upper limit value, the maximum value and the minimum value of the image distance gain corresponding to the real object distance within the depth-of-field range are calculated, the optimal image distance gain is calculated in accordance with the maximum value and the minimum value, the optimal object distance of the focused target is acquired in accordance with the optimal image distance gain, and the optimal size of the focused target is calculated in accordance with the optimal object distance. As a result, it is able to accurately calculate such focusing parameters as a focusing position and a target size in accordance with a specific parameter of an application scenario, thereby to improve an imaging effect, and solve the problem in the related art where the focusing accuracy is insufficient and an imaging effect is not good.

The present disclosure further provides in some embodiments an intelligent terminal, which includes a data collection unit, a processor and a memory. The data collection unit is configured to collected data, the memory is configured to store therein one or more program instructions, and the processor is configured to execute the one or more program instructions to implement the above-mentioned method.

The present disclosure further provides in some embodiments a computer-readable storage medium storing therein one or more program instructions. The one or more program instructions is executed by a processor so as to implement the above-mentioned method.

In the embodiments of the present disclosure, the processor may be an integrated circuit (IC) having a signal processing capability. The processor may be a general-purpose processor, a Digital Signal Processor (DSP), an Application Specific Integrated Circuit (ASIC), a Field Programmable Gate Array (FPGA) or any other programmable logic element, discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as a Random Access Memory (RAM), a flash memory, a Read-Only Memory (ROM), a Programmable ROM (PROM), an Electrically Erasable PROM (EEPROM), or a register. The processor may read information stored in the storage medium so as to implement the steps of the method in conjunction with the hardware.

The storage medium may be a memory, e.g., a volatile, a nonvolatile memory, or both.

The nonvolatile memory may be an ROM, a PROM, an EPROM, an EEPROM or a flash disk.

The volatile memory may be an RAM which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM).

The storage medium in the embodiments of the present disclosure intends to include, but not limited to, the above-mentioned and any other appropriate memories.

It should be appreciated that, in one or more examples, the functions mentioned in the embodiments of the present disclosure may be achieved through hardware in conjunction with software. For the implementation, the corresponding functions may be stored in a computer-readable medium, or may be transmitted as one or more instructions on the computer-readable medium. The computer-readable medium may include a computer-readable storage medium and a communication medium. The communication medium may include any medium capable of transmitting a computer program from one place to another place. The storage medium may be any available medium capable of being accessed by a general-purpose or special-purpose computer.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for calculating a focusing parameter of a binocular stereo camera, comprising:
    calculating a lower limit value and an upper limit value of a distance measurement range;
    acquiring a depth-of-field range in accordance with the lower limit value and the upper limit value;
    calculating a maximum value and a minimum value of an image distance gain corresponding to a real object distance within the depth-of-field range, and calculating an optimal image distance gain in accordance with the maximum value and the minimum value;
    acquiring an optimal object distance of a focused target in accordance with the optimal image distance gain; and
    calculating an optimal size of the focused target in accordance with the optimal object distance, wherein the step of calculating the optimal image distance gain in accordance with the maximum value and the minimum value according to $\Delta V_{best}=(\Delta V_{max}-\Delta V_{min})/2+\Delta V_{min}$, wherein $\Delta V_{best}$ represents the optimal image distance gain, $\Delta V_{max}$ represents a maximum value of the image distance gain, and $\Delta V_{min}$ represents the minimum value of the image distance gain.

2. The method according to claim 1, wherein the step of calculating the lower limit value and the upper limit value of the distance measurement range comprises:

calculating the lower limit value of the distance measurement range according to $U_{min}=f\times B/d_{max}$; and calculating the upper limit value of the distance measurement range according to $U_{max}=f\times B/d_{min}$, wherein f represents a focal length of the binocular stero camera, $U_{min}$ represents the lower limit value of the distance measurement range, $U_{max}$ represents the upper limit value of the distance measurement range, $d_{max}$ represents a maximum disparity value of an object, $d_{min}$ represents a minimum disparity value of the object, and B represents a baseline distance of the binocular stereo camera.

3. The method according to claim 2, wherein the step of calculating the maximum value and the minimum value of the image distance gain corresponding to the real object distance within the depth-of-field range comprises calculating the image distance gain according to $\Delta V=V_{real}-f=f^2/U_{real}$, wherein $U_{real}$ represents the real object distance of the object, $V_{real}$ represents an image distance corresponding to the object, and $\Delta V$ represents the image distance gain.

4. The method according to claim 1, wherein the step of acquiring the optimal object distance of the focused target in accordance with the optimal image distance gain comprises calculating the optimal object distance of the focused target according to $U_{best}=f^2/\Delta V_{best}$, wherein $U_{best}$ represents the optimal object distance of the focused target, and $\Delta V_{best}$ represents the optimal image distance gain.

5. The method according to claim 1, wherein the step of calculating the optimal size of the focused target in accordance with the optimal object distance comprises: determining a profile of the focused target, and calculating an image size of a line pair and a size of the target; and calculating a quantity of line pairs and a width of a line pair in accordance with the image size of the line pair and the size of the target.

6. The method according to claim 5, wherein the calculating the image size of the line pair comprises calculating the image size of the line pair according to $Wid_{lp}=Num_{pixel}\times Wid_{sensor}$, wherein $Num_{pixel}$ represents the quantity of pixels corresponding to one line pair, $Wid_{sensor}$ represents a size of a photosensitive unit in a pixel, and $Wid_{lp}$ represents the image size of one line pair.

7. The method according to claim 6, wherein the calculating the size of the target, the quantity of line pairs and the width of the line pair comprises: calculating the size of the target according to $$\frac{Wid_{Obj}}{U_{best}}=\frac{Wid_{Img}}{V_{best}};$$

calculating the quantity of line pairs according to $Num_{lp}p=Wid_{Img}/Wid_{lp}$; and calculating the width of the line pair according to $Wid_{reallp}=Wid_{Obj}/Num_{lp}$, wherein $Wid_{Obj}$ represents a real width of the target, $Wid_{Img}$ represents a width of the target when it is imaged in a sensor, $U_{best}$ represents the optimal object distance of the target, $V_{best}$ represents the optimal image distance gain, $Num_{lp}$ represents the quantity of line pairs of the target, $Wid_{lp}$ represents a width of one line pair when it is imaged in the sensor, $Wid_{reallp}$ represents a width of the line pair on the target, and $Wid_{Obj}$ represents the size of the target.

* * * * *